United States Patent
Windsor

(10) Patent No.: US 11,330,437 B2
(45) Date of Patent: May 10, 2022

(54) DETECTING DATA EXFILTRATION USING MACHINE LEARNING ON PERSONAL E-MAIL ACCOUNT DISPLAY NAMES

(71) Applicant: Fortinet, Inc., Sunnyvale, CA (US)

(72) Inventor: Carl Mark Windsor, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 381 days.

(21) Appl. No.: 16/724,199

(22) Filed: Dec. 21, 2019

(65) Prior Publication Data

US 2021/0195422 A1    Jun. 24, 2021

(51) Int. Cl.
*H04W 12/08* (2021.01)
*G06Q 10/10* (2012.01)
*H04W 12/30* (2021.01)

(52) U.S. Cl.
CPC .......... *H04W 12/08* (2013.01); *G06Q 10/107* (2013.01); *H04W 12/35* (2021.01)

(58) Field of Classification Search
CPC ..... H04W 12/08; H04W 12/35; G06Q 10/107
See application file for complete search history.

(56) References Cited

U.S. PATENT DOCUMENTS

| | | | |
|---|---|---|---|
| 8,688,657 B1* | 4/2014 | Newstadt | G06F 16/00 707/694 |
| 8,763,072 B2* | 6/2014 | Agrawal | G06F 21/64 726/1 |
| 8,935,752 B1* | 1/2015 | Chen | H04L 63/1408 726/4 |
| 9,652,597 B2* | 5/2017 | Roundy | H04L 67/42 |
| 2017/0213041 A1* | 7/2017 | Medvedev | H04L 63/0428 |
| 2019/0108355 A1* | 4/2019 | Carson | G06N 20/00 |

* cited by examiner

*Primary Examiner* — Bryan Lee
(74) *Attorney, Agent, or Firm* — Law Office of Dorian Cartwright; Dorian Cartwright

(57) ABSTRACT

An e-mail application is identified by parsing a network packet from the network packets. Responsive to the e-mail application identification, a display name associated with the user is extracted and the display name is stored among a plurality of display names in association with the company e-mail address of the user. Responsive to one of the plurality of display names matching a display name of a private e-mail address of the user as a destination of e-mail along with surpassing a threshold amount of data transfer, the user is flagged for possible data exfiltration.

5 Claims, 5 Drawing Sheets

DETECTING DATA EXFILTRATION USING MACHINE LEARNING ON PERSONAL E-MAIL ACCOUNT DISPLAY NAMES

FIELD OF THE INVENTION

The invention relates generally to computer networking, and more specifically, to improving data security by detecting data exfiltration using machine learning on personal e-mail account display names.

BACKGROUND

Cyber security is important to businesses given their vulnerability to data theft. For example, malicious data exfiltration can occur when an unauthorized hacker accesses and exports copies of data from an enterprise network to an unauthorized destination outside of the enterprise network. Private data, sensitive financial information, trade secrets, company files, and the like are at risk. In another example, a rogue employee as an authorized user of the enterprise network may copy software code.

One current solution for detecting data exfiltration involves monitoring outbound network traffic from specific network addresses for anomalies. However, this solution is blunt and does not leverage artificial intelligence gathered processing data within an enterprise network.

What is needed is a robust technique for improving data security by detecting data exfiltration using machine learning on enterprise data traffic for personal e-mail account display names.

SUMMARY

To meet the above-described needs, methods, computer program products, and systems for detecting data exfiltration using machine learning on enterprise data traffic for personal e-mail account display names.

In one embodiment, network packets are received between a station of a plurality of stations on the Wi-Fi network and a remote destination on the data communication network. A user of the station and a company e-mail address associated with the user are identified. An e-mail application is identified. by parsing a network packet from the network packets.

In some embodiments, responsive to the e-mail application identification, a display name associated with the user is extracted and the display name is stored among a plurality of display names in association with the company e-mail address of the user. Responsive to one of the plurality of display names matching a display name of a private e-mail address of the user as a destination of e-mail along with surpassing a threshold amount of data transfer, the user is flagged for possible data exfiltration.

Remedial actions can be taken right away. A ticket of information about the possible data exfiltration can be generated for review. Also electronic notifications can be sent out as preconfigured.

Advantageously, network performance is improved with better data security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for detecting data exfiltration using machine learning on enterprise data traffic for personal e-mail account display names.

Figure 1:
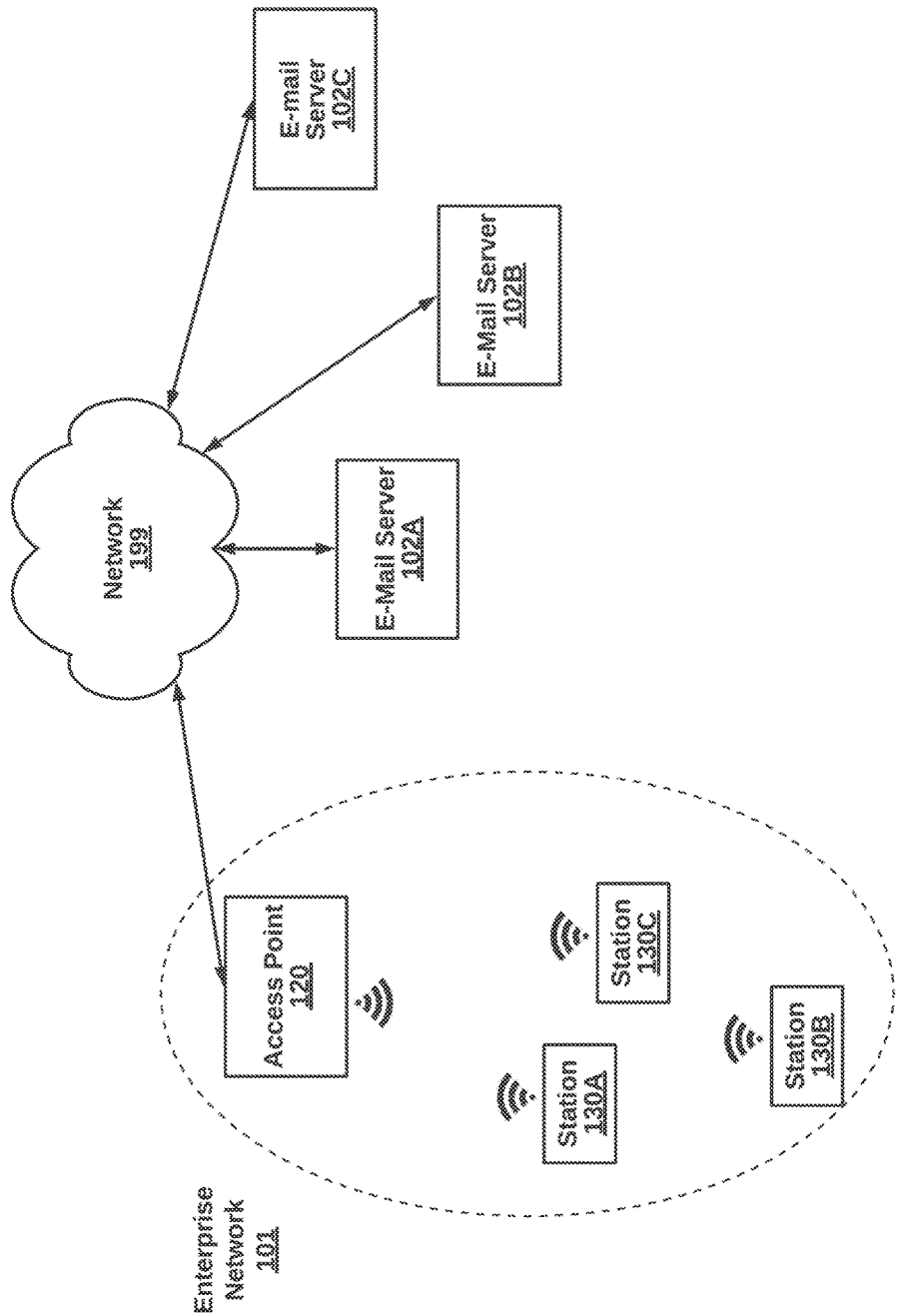
FIG. 1 is a high-level block diagram illustrating a system for detecting data exfiltration using machine learning on enterprise data traffic for personal e-mail account display names, according to one embodiment.
Figures 2A, 2B:
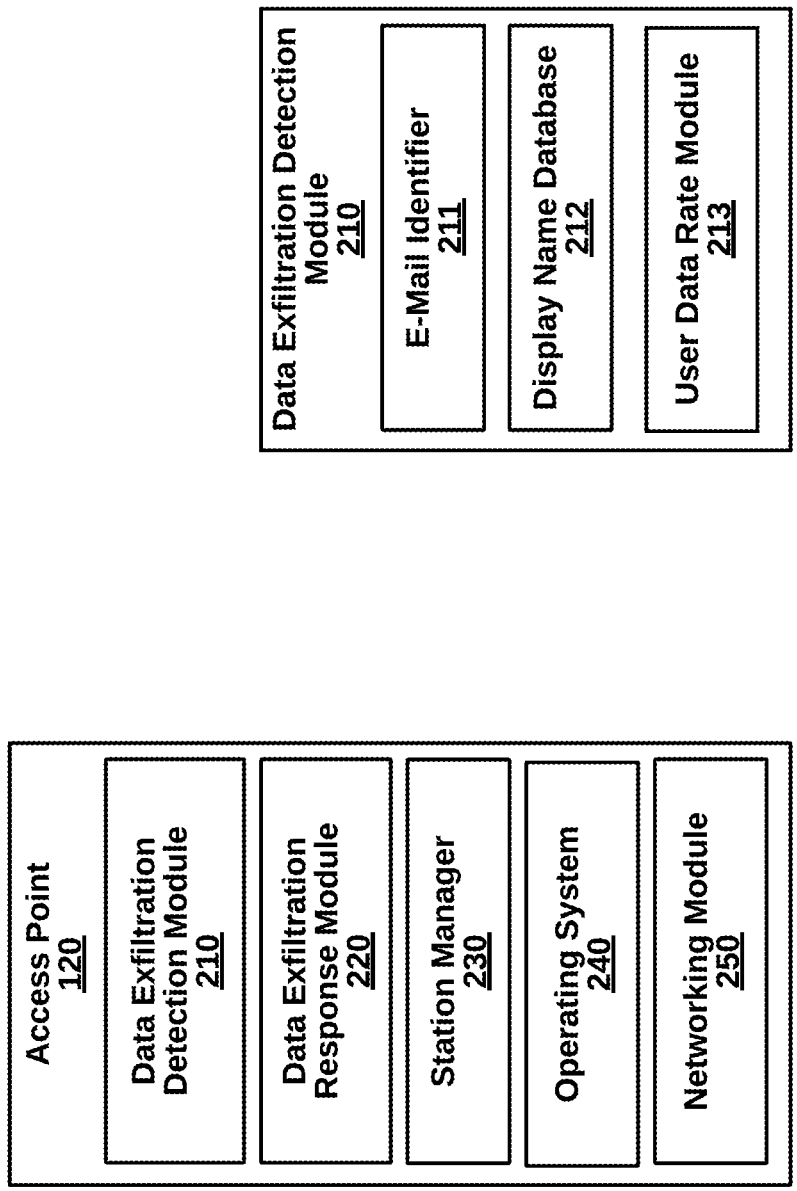
FIG. 2 is a more detailed block diagram illustrating an example access point of the system of FIG. 1, according to one embodiment.
Figure 3:
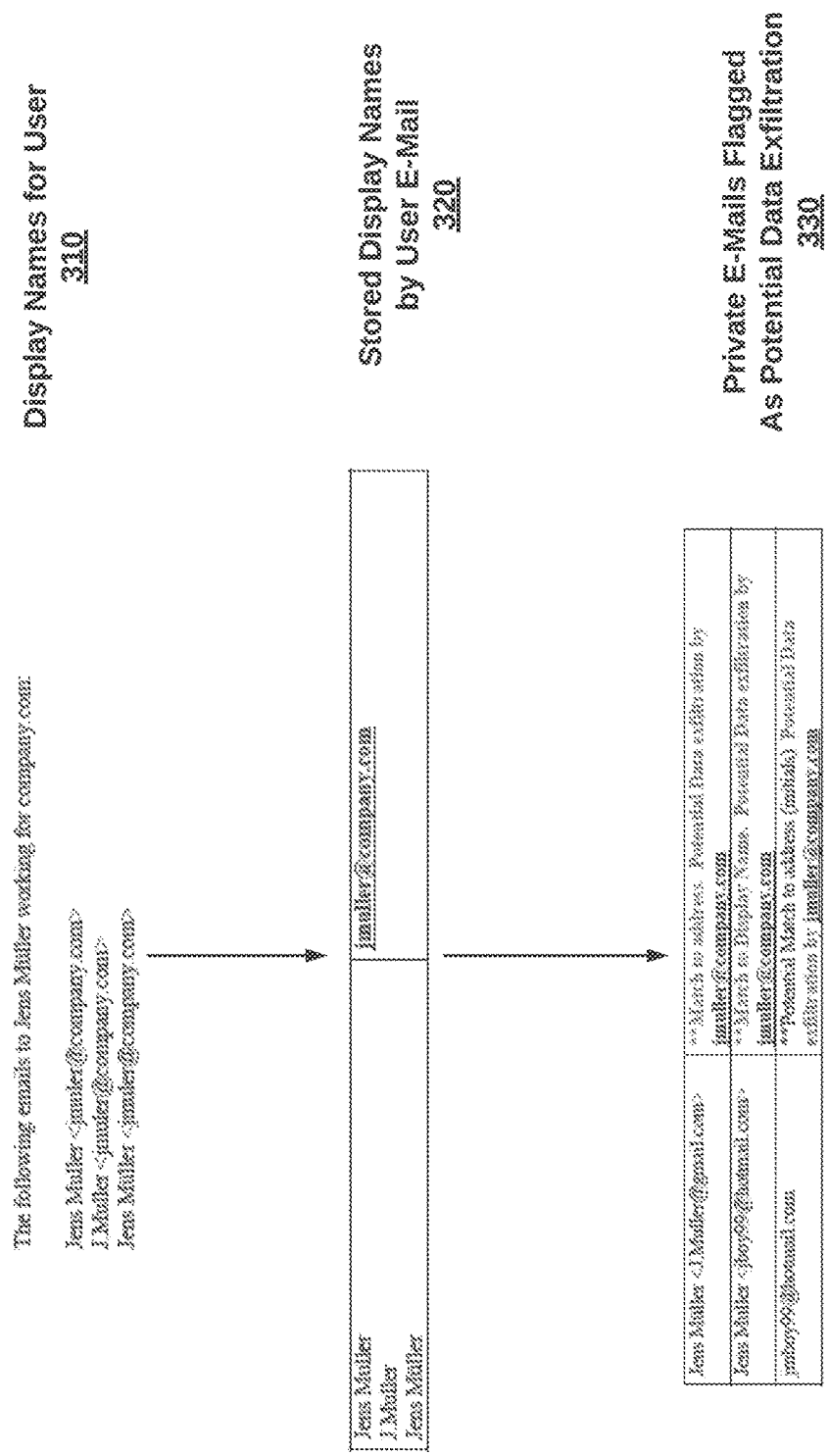
FIG. 3 are example screenshots of processing for destination IP addresses, according to some embodiments.

Systems for Data Exfiltration Detection (FIGS. 1-3)

FIG. 1 is a high-level block diagram illustrating a system for detecting data exfiltration using machine learning on enterprise data traffic for personal e-mail account display names, according to one embodiment. The system 100 includes an enterprise LAN 101 and cloud-based e-mail servers 105A-C. The enterprise LAN 101 has Wi-Fi controller 110, access point 120, and stations 130A-C. Other embodiments of the system 100 can include additional network components that are not shown in FIG. 1. For example, there can be multiple enterprise LANs, a Wi-Fi controller managing access points more access points, and more stations. There can also be network devices such as switches, routers, fire walls, proxy servers, and other there can be other network architectures.

In an embodiment, the stations 130A-C access resources on the cloud-based e-mail severs 102A-C for storing exfiltrated data. For instance, large data transfers to known private e-mail servers such as @gmail.com and @yahoo.com. To accommodate these services, the enterprise LAN 101 is communicatively coupled to the cloud-based e-mail servers 102A-C over the network 199, along with the Wi-Fi controller 110. The access point 120 is also preferably connected by wire to the network 199 and connected wirelessly to the stations 130A-C. The network 199 can comprise a data communication network such as the Internet, WAN (wide area network), VLAN (virtual local access network), a LAN (local access network), a cellular network (e.g., 3G, 4G or 5G), or a hybrid network.

In one embodiment, the access point 120 identifies e-mail in network packets and extracts a display name from the e-mail. The display name is stored among multiple display names for a common company e-mail address if an entry does not exist. On the other hand, if the entry does already exist prior to this e-mail, then a private e-mail has been identified, in an embodiment. In an anomalous case, data transfer associated with the private e-mail exceeds a threshold. In response, a potential exfiltration of data may be identified and notifications are sent. The information can be gathered into a ticket or record for later analysis.

The access point 120 can be any of the computing devices, such as a personal computer, a server blade, any computing environment as shown in FIG. 6. For example, the AP 101 can be an Access Point-Model 101 or an Access Point-Model 433 (modified as discussed herein) by Fortinet, Inc. The access point 120 is described in more detail in association with FIG. 2.

Some decisions are applied by the Wi-Fi controller locally at the access points based on non-local data and non-local parameters. The Wi-Fi controller can also run applications (e.g., SDN or Software-Defined Networking applications). The Wi-Fi controller can be, for example, an MC1500 or MC6000 device by Fortinet, Inc. of Sunnyvale, Calif.

The stations 130A-C (or mobile station, STA, client or wireless device) can be, for example, a personal computer, laptop computer, tablet computer, smart phone, mobile computing device, Internet appliance, end station or any other computing device as described in FIG. 6. The stations 130A-C wirelessly couple to APs using a radio and antenna. No pre-configuration or client is needed. The stations 130A-C operate according to wireless standards such as IEEE 802.11a, b, g, n, ac, w or any other wireless standard. The stations 130A-C can send and receive network packets for applications being executed.

Located remotely from the enterprise network 101, the cloud-based e-mails servers 102A-C can be executed within data centers, such as AWS (Amazon Web Services). The e-mail servers 102A-C can host e-mail with large storage services, such as G-Mail, Yahoo! Mail, Hotmail, and the like.

FIG. 2A is a more detailed block diagram illustrating the access point 120 of the system 100 of FIG. 1, according to one embodiment. The access point 120 includes a data exfiltration detection module 210, a data exfiltration response module 220, a station manager 230, an operating system 240, and networking ports 250. The components can be implemented in hardware, software, or a combination of both.

The data exfiltration detection module 210 identifies potential threats. The detection can be implemented as a standalone cyber security measure, or be implemented as part of a larger cyber security system. Turning to FIG. 2B, an e-mail identifier 211 examines for e-mail traffic using deep packet inspection, header inspection, or other mechanisms. A display name database 212 stores display names discovered and grouped with other display names previously discovered for a particular user. When the user is detected as transferring large amounts of data to a private e-mail account, as determined by the user data rate module 213, early action can be taken, as described below. Display names are identified, for example, using a template of where the display name appears in an e-mail for a particular provider or for a particular protocol.

Returning to FIG. 2A, the data exfiltration response module 220 takes action for potential threats identified by the data exfiltration detection module 210. For example, notifications can be sent out to preconfigured e-mail addresses or telephone numbers. The notifications can be e-mail, SMS message, or the like. In other embodiments, the data exfiltration response module 220 takes more proactive measures such as shutting down or limiting the data transfer itself.

The station management module 230 manages station connections by advertising beacons, receiving probe request, sending probe responses and other management frames. Further, individual stations can be tracked as to bandwidth usage, QoS, BSSID assignment, and the like. Beacons and probe responses can also be modified by the station management module 230 to include channel switch announcement information.

The operating system 240 interfaces between the software and hardware of the access point 120. The operating system 240 can also include integrated applications.

Finally, for the embodiment of FIG. 2, the networking module 250 includes connection ports and networking hardware and software for exchanging network packets over the channel.

Figure 4:
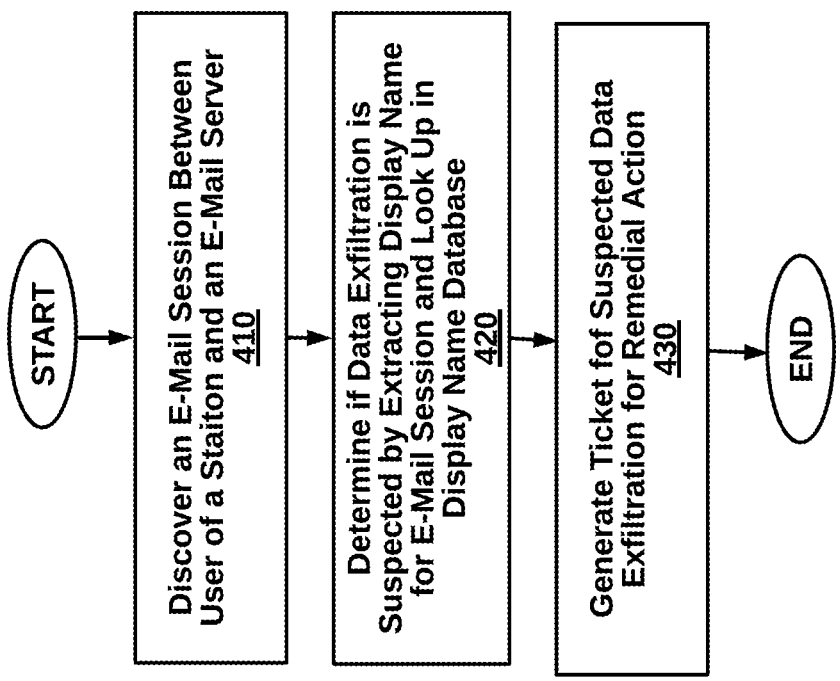
FIG. 4 is a high-level flow diagram illustrating a method for detecting data exfiltration using machine learning on enterprise data traffic for personal e-mail account display names, according to one embodiment.

Methods for Detecting Data Exfiltration (FIG. 4)

FIG. 4 is a high-level flow diagram illustrating a method 400 for DNS-based application-awareness routing, according to one embodiment. The method 400 can be implemented by, for example, the access point 120 of FIG. 1.

At step 410, an e-mail session between a user of as station and an e-mail server is discovered. At step 420, a display name is extracted and looked up in a database of display names. If machine learning algorithms identify a private e-mail address from the previous display names compared against the current display name, the private e-mail may be suspicious. A data rate test can be applied to see if a threshold has been exceed for the amount or the rate of data transferred in association with the private e-mail. One embodiment, considers all of the display names in aggregate when determining data rate violations. At step 430, if data exfiltration is determined, a ticket is generated by compiling relevant information for later analysis by an administrator.

Figure 5:
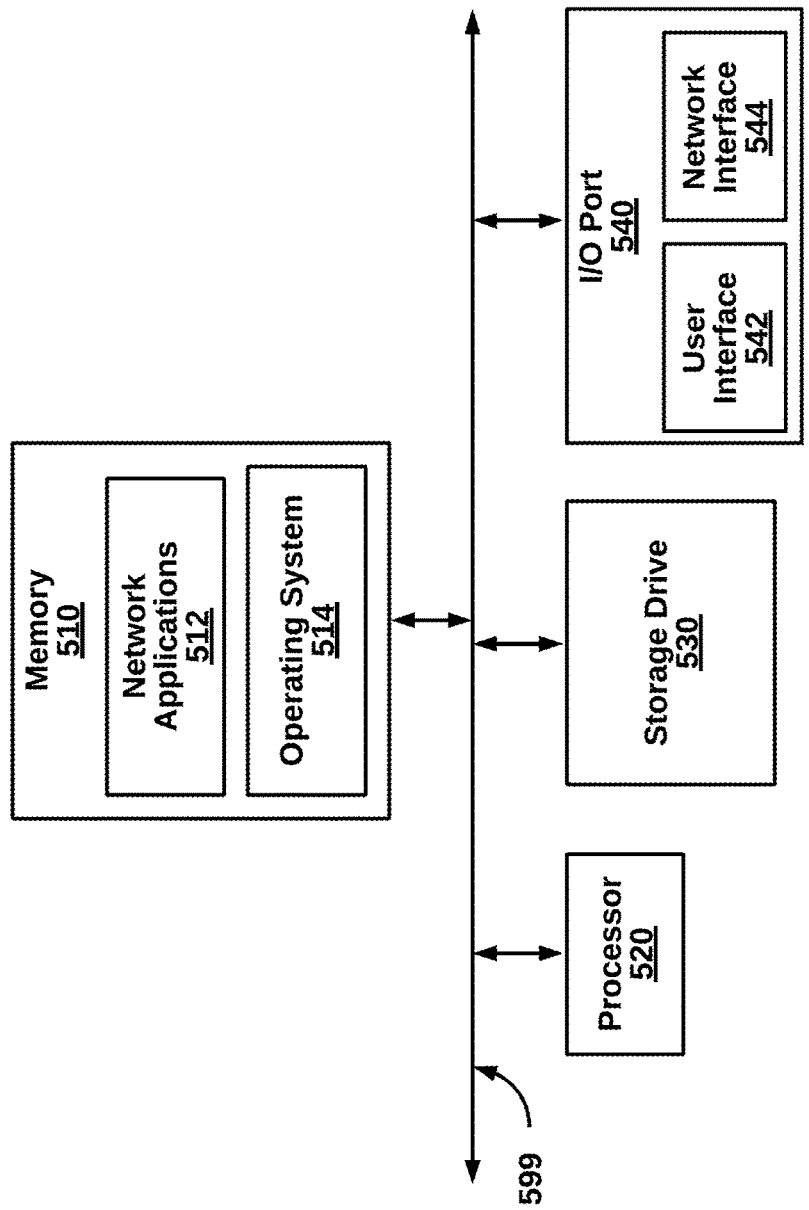
FIG. 5 is a block diagram illustrating an example computing device, according to one embodiment.

Generic Computing Device (FIG. 5)

FIG. 5 is a block diagram illustrating an exemplary computing device 500 for use in the system 100 of FIG. 1, according to one embodiment. The computing device 500 is an exemplary device that is implementable for each of the components of the system 100, such as the cloud-based SD-WAN controller 110, the access point 120, and the stations 130A-C. Additionally, the computing device 500 is merely an example implementation itself, since the system 100 can also be fully or partially implemented with laptop computers, tablet computers, smart cell phones, Internet appliances, and the like.

The computing device 500, of the present embodiment, includes a memory 510, a processor 520, a hard drive 530, and an I/O port 540. Each of the components is coupled for electronic communication via a bus 550. Communication can be digital and/or analog, and use any suitable protocol.

The memory 510 further comprises network applications 512 and an operating system 514. The network applications 520 can include the modules of network applications. Other network applications can include 512 a web browser, a mobile application, an application that uses networking, a remote application executing locally, a network protocol application, a network management application, a network routing application, or the like.

The operating system 514 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 6 or Windows 10), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 520 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the hard drive 530.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in an access point communicatively coupled to a data communication network and also communicatively coupled to a Wi-Fi network, the method for detecting data exfiltration using machine learning on enterprise data traffic for personal e-mail account display names, the method comprising the steps of:

receiving network packets between a station of a plurality of stations on the Wi-Fi network and a remote destination on the data communication network;

identifying a user of the station and a company e-mail address associated with the user;

identifying an e-mail application by parsing a network packet from the network packets;

responsive to the e-mail application identification, extracting a display name associated with the user and storing the display name among a plurality of display names in association with the company e-mail address of the user;

responsive to one of the plurality of display names matching a display name of a private e-mail address of the user as a destination of e-mail along with surpassing a threshold amount of data transfer, flagging the user for possible data exfiltration; and generating a ticket of information about the possible data exfiltration for review.

2. The method of claim 1, wherein the generated ticket is also responsive to surpassing a threshold rate of data transfer.

3. The method of claim 1, wherein the threshold amount of data transfer is measured across e-mails of all of the plurality of display names collectively.

4. The method of claim 1, wherein the e-mail application identification comprises packet sniffing or source IP address identification.

5. A non-transitory computer-readable medium storing instructions that, when executed by a processor, perform a computer-implemented method in an access point communicatively coupled to a data communication network and also communicatively coupled to a Wi-Fi network, the method for detecting data exfiltration using machine learning on enterprise data traffic for personal e-mail account display names, the method comprising the steps of:

receiving network packets between a station of a plurality of stations on the Wi-Fi network and a remote destination on the data communication network;

identifying a user of the station and a company e-mail address associated with the user;

identifying an e-mail application by parsing a network packet from the network packets;

responsive to the e-mail application identification, extracting a display name associated with the user and storing the display name among a plurality of display names in association with the company e-mail address of the user;

responsive to one of the plurality of display names matching a display name of a private e-mail address of the user as a destination of e-mail along with surpassing a threshold amount of data transfer, flagging the user for possible data exfiltration; and generating a ticket of information about the possible data exfiltration for review.

\* \* \* \* \*